United States Patent
Ellis

(10) Patent No.: US 12,281,943 B1
(45) Date of Patent: Apr. 22, 2025

(54) COATED WITH FIRST COLOR AND COMPLEMENTARY SECOND COLOR

(71) Applicant: BMIC LLC, Dallas, TX (US)

(72) Inventor: David Ellis, Perkasie, PA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/524,670

(22) Filed: Nov. 30, 2023

Related U.S. Application Data

(63) Continuation of application No. 18/060,174, filed on Nov. 30, 2022, now abandoned.

(51) Int. Cl.
*G01J 3/46* (2006.01)
*E04D 1/26* (2006.01)

(52) U.S. Cl.
CPC ............... *G01J 3/463* (2013.01); *E04D 1/26* (2013.01)

(58) Field of Classification Search
CPC .................................. G01J 3/463; E04D 1/26
See application file for complete search history.

(56) References Cited

U.S. PATENT DOCUMENTS

| | | | |
|---|---|---|---|
| 7,919,170 B2 | 4/2011 | Gross et al. | |
| 9,019,296 B1* | 4/2015 | Abraham | G06Q 30/02 345/593 |
| 2001/0049002 A1 | 12/2001 | McCumber et al. | |
| 2003/0152747 A1 | 8/2003 | Fensel et al. | |
| 2013/0095293 A1 | 4/2013 | Boss et al. | |
| 2018/0363301 A1 | 12/2018 | Freiborg | |
| 2020/0285691 A1 | 9/2020 | Hoff | |
| 2021/0082158 A1* | 3/2021 | Norris | G06T 1/20 |

FOREIGN PATENT DOCUMENTS

CA 2731838 A1 2/2010

OTHER PUBLICATIONS

Feiz et al., "A Survey on Applying the Golden Ratio in Product Packaging and its Effect on Consumers' Buying Behavior", Journal of Business Management, vol. 2, Issue 4—Serial No. 6, Mar. 2011.

(Continued)

*Primary Examiner* — Nathan L Van Sell
(74) *Attorney, Agent, or Firm* — GREENBERG TRAURIG, LLP

(57) ABSTRACT

Method of manufacturing a colored product, which includes obtaining a first colored covering material, where the first colored covering material is a first covering material coated with a first coating, where the first coating has a first color, where the first color has a first wavelength, where the first wavelength is 400 nm to 620 nm; measuring the first wavelength of the first color; determining a second wavelength of a second color, where the determining includes calculating the second wavelength by multiplying the first wavelength by a first phi factor, where the first phi factor is a product of n times φ, where n is 0.1 to 100, where φ is 1.618±ε, where ε is 0 to 1, where the second wavelength is 585 nm to 800 nm; obtaining a second covering material, and a second coating having the second color; coating the second covering material with the second coating, to form a second colored covering material; and applying the first colored covering material and the second colored covering material to a product, to form the colored product.

20 Claims, 5 Drawing Sheets

(56) References Cited

OTHER PUBLICATIONS

Patterson, "Interior Design 101: The Golden Ratio & 60/30/10 Rule", HOUSEtipster, Nov. 28, 2019.
Meisner, "Golden Ratio Relationships in Color", Phi Point Solutions, LLC, May 9, 2012.
Ali et al., "The use of formal aesthetic principles as a tool for design conceptualisation and detailing", NordDesign 2014, pp. 490-499.
Reusch, "Visible and Ultraviolet Spectroscopy," May 5, 2013 <<https://www2.chemistry.msu.edu/faculty/reusch/virttxtjml/spectrpy/uv-vis/spectrum.htm>>.

* cited by examiner

COATED WITH FIRST COLOR AND COMPLEMENTARY SECOND COLOR

FIELD

This disclosure generally relates to products having complementary colors and related methods.

SUMMARY

In some embodiments, the present invention provides a method of manufacturing a colored product, comprising: obtaining a first colored covering material, wherein the first colored covering material is a first covering material coated with a first coating, wherein the first coating has a first color, wherein the first color has a first wavelength, wherein the first wavelength is 400 nm to 620 nm; measuring the first wavelength of the first color; determining a second wavelength of a second color, wherein the determining comprises: calculating the second wavelength by multiplying the first wavelength by a first phi factor, wherein the first phi factor is a product of n times φ, wherein n is 0.1 to 100, wherein φ is 1.618±ε, wherein ε is 0 to 1, wherein the second wavelength is 585 nm to 800 nm; obtaining a second covering material, and a second coating having the second color; coating the second covering material with the second coating, thereby to form a second colored covering material; and applying the first colored covering material and the second colored covering material to a product, so as to form the colored product.

In some embodiments, n is 0.3 to 1.2.
In some embodiments, ε is 0.
In some embodiments, n is 0.3 to 1.2.
In some embodiments, the measuring the first wavelength of the first color comprises using at least one of a colorimeter or a spectrophotometer.
In some embodiments, the first wavelength is 400 nm to 585 nm.
In some embodiments, the second wavelength is 620 nm to 800 nm.

In some embodiments, the present invention provides a method of manufacturing a colored product, comprising: obtaining a first colored covering material, wherein the first colored covering material is a first covering material coated with a first coating, wherein the first coating has a first color, wherein the first color has a first wavelength, wherein the first wavelength is 400 nm to 620 nm; measuring the first wavelength of the first color; determining a second wavelength of a second color, wherein the determining the second wavelength of the second color comprises: calculating the second wavelength by multiplying the first wavelength by a first phi factor, wherein the first phi factor is a product of n times φ, wherein n is 0.1 to 100, wherein φ is 1.618±8, wherein ε is 0 to 1, wherein the second wavelength is 585 nm to 800 nm; determining a third wavelength of a third color, wherein the determining the third wavelength of the third color comprises: calculating the third wavelength by multiplying the first wavelength by a second phi factor, wherein the second phi factor is a product of n times φ, wherein n is 0.1 to 100, wherein φ is 1.618±8, wherein ε is 0 to 1; obtaining a second covering material, a third covering material, a second coating having the second color, and a third coating having the third color; coating each of the second covering material with the second coating, thereby to form a second colored covering material, and the third covering material with the third coating, thereby to form a third colored covering material; and applying the first colored covering material, the second colored covering material, and the third covering material to a product, so as to form the colored product.

In some embodiments, n is 0.3 to 1.2.
In some embodiments, ε is 0.
In some embodiments, n is 0.3 to 1.2.
In some embodiments, the measuring the first wavelength of the first color comprises using at least one of a colorimeter or a spectrophotometer.
In some embodiments, the first wavelength is 400 nm to 585 nm.
In some embodiments, the second wavelength is 620 nm to 800 nm.

In some embodiments, the present invention provides a method of manufacturing at least two colored products, comprising: obtaining a first colored covering material, wherein the first colored covering material is a first covering material coated with a first coating, wherein the first coating has a first color, wherein the first color has a first wavelength, wherein the first wavelength is 400 nm to 620 nm; measuring the first wavelength of the first color; determining a second wavelength of a second color, wherein the determining the second wavelength of the second color comprises: calculating the second wavelength by multiplying the first wavelength by a first phi factor, wherein the first phi factor is a product of n times φ, wherein n is 0.1 to 100, wherein φ is 1.618±ε, wherein ε is 0 to 1, wherein the second wavelength is 585 nm to 800 nm; determining a third wavelength of a third color, wherein the determining the third wavelength of the third color comprises: calculating the third wavelength by multiplying the first wavelength by a second phi factor, wherein the second phi factor is a product of n times φ, wherein n is 0.1 to 100, wherein q is 1.618±ε, wherein ε is 0 to 1; obtaining a second covering material, a third covering material, a second coating having the second color, and a third coating having the third color; coating each of the second covering material with the second coating, thereby to form a second colored covering material, and the third covering material with the third coating, thereby to form a third colored covering material; applying each of the first colored covering material and the second colored covering material to a first product, so as to form a first colored product, and the third covering material to a second product, so as to form a second colored product; and installing the first colored product and the second colored product adjacent one another.

In some embodiments, n is 0.3 to 1.2.
In some embodiments, ε is 0.
In some embodiments, n is 0.3 to 1.2.
In some embodiments, the first wavelength is 400 nm to 585 nm.
In some embodiments, the second wavelength is 620 nm to 800 nm.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Some embodiments of the present disclosure relate to building materials having complementary colors and related methods.

As used herein, the term "building material" refers to any material or component of a building. In some embodiments, the building material comprises an exterior component of a building. In some embodiments, the building material comprises an interior component of a building. In some embodiments, the building comprises at least one of residential buildings (e.g., a dwelling), commercial buildings, industrial buildings, or any combination thereof. In some embodiments, the building material comprises, consists of, or consists essentially of at least one of roofing materials, siding materials, framing materials, flooring materials, or any combination thereof. In some embodiments, the building material does not comprise an interior component of a building (e.g., interior walls). In some embodiments, the building material comprises, consists of, or consists essentially of a roofing material.

As used herein, the term "roofing material" refers to any material or component of a roof. In some embodiments, the roofing material comprises, consists of, or consists essentially of at least one of a shingle, a membrane, an underlayment, a tile, a photovoltaic, a roofing granule, a roof panel or panel roofing (e.g., metal panel roofing, steel panel roofing, alloy panel roofing, aluminum panel roofing, and the like), a non-asphaltic roofing shingle, a non-asphalt roof membrane, a polymeric roofing material, or any combination thereof. In some embodiments, the roofing material comprises a plurality of roofing granules. In some embodiments, the roofing material comprises at least one roofing shingle. In some embodiments, the roofing material comprises, consists of, or consists essentially of asphalt. For example, in some embodiments, the roofing material comprises 0.1% to 49% by weight of asphalt based on a total weight of the roofing material. In some embodiments, the roofing material does not comprise asphalt. For example, in some embodiments, the roofing material is a non-asphaltic roofing material.

Figure 1:
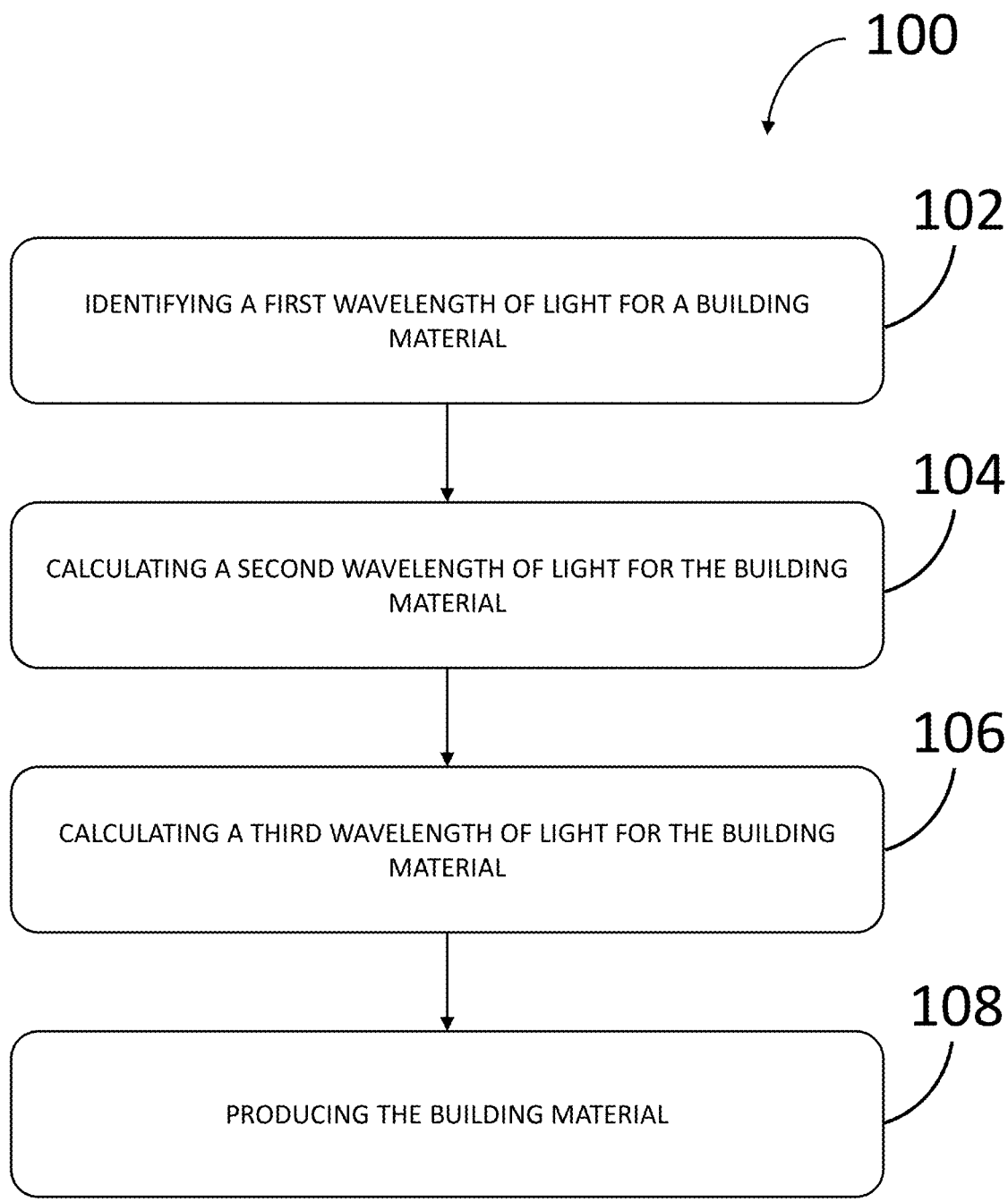
FIG. 1 is a flowchart of a method for producing a building material, according to some embodiments.

FIG. 1 is a flowchart of a method for producing a building material, according to some embodiments. As shown in FIG. 1, the method 100 for producing a building material comprises, consists of, or consists essentially of one or more of the following steps: a step 102 of identifying a first wavelength of light for a building material; a step 104 of calculating a second wavelength of light for the building material; a step 106 of calculating a third wavelength of light for the building material; and a step 108 of producing the building material.

At step 102, in some embodiments, the method 100 comprises identifying a first wavelength of light for a building material.

In some embodiments, the identifying comprises selecting the first wavelength of light. In some embodiments, the identifying comprises measuring the first wavelength of light. In some embodiments, the identifying comprises detecting the first wavelength of light. In some embodiments, the identifying comprises observing the first wavelength of light. In some embodiments, the identifying comprises requesting the first wavelength of light. In some embodiments, the identifying comprises obtaining the first wavelength of light. In some embodiments, the identifying comprises determining the first wavelength of light.

In some embodiments, the first wavelength of light defines a first color. In some embodiments, the first wavelength of light has a wavelength in a range of 400 nm to 800 nm. In some embodiments, the first wavelength of light has a wavelength in a range of 400 nm to 420 nm. In some embodiments, the first wavelength of light has a wavelength in a range of 400 nm to 440 nm. In some embodiments, the first wavelength of light has a wavelength in a range of 400 nm to 490 nm. In some embodiments, the first wavelength of light has a wavelength in a range of 400 nm to 570 nm. In some embodiments, the first wavelength of light has a wavelength in a range of 400 nm to 585 nm. In some embodiments, the first wavelength of light has a wavelength in a range of 400 nm to 620 nm. In some embodiments, the first wavelength of light has a wavelength in a range of 400 nm to 780 nm.

In some embodiments, the first wavelength of light has a wavelength in a range of 420 nm to 780 nm. In some embodiments, the first wavelength of light has a wavelength in a range of 440 nm to 780 nm. In some embodiments, the first wavelength of light has a wavelength in a range of 490 nm to 780 nm. In some embodiments, the first wavelength of light has a wavelength in a range of 570 nm to 780 nm. In some embodiments, the first wavelength of light has a wavelength in a range of 585 nm to 780 nm. In some embodiments, the first wavelength of light has a wavelength in a range of 620 nm to 780 nm.

In some embodiments, the first wavelength of light has a wavelength in a range of 420 nm to 440 nm. In some embodiments, the first wavelength of light has a wavelength in a range of 440 nm to 490 nm. In some embodiments, the first wavelength of light has a wavelength in a range of 490 nm to 570 nm. In some embodiments, the first wavelength of light has a wavelength in a range of 570 nm to 585 nm. In some embodiments, the first wavelength of light has a wavelength in a range of 585 nm to 620 nm. In some embodiments, the first wavelength of light has a wavelength in a range of 620 nm to 780 nm.

At step 104, in some embodiments, the method 100 comprises calculating a second wavelength of light for the building material.

As used herein, the term "calculating" refers to a mathematical operation. In some embodiments, the calculating comprises a mathematical operation in which A is multiplied times B to obtain a product C. The mathematical operation is represented by the following mathematical formula: A×B=C. For example, in some embodiments, a second wavelength of light is calculated by multiplying a first wavelength of light times a phi factor. In some embodiments, the first wavelength of light is light having a wavelength in the visible spectrum. For example, in some embodiments, the first wavelength of light is 400 nm. In some embodiments, the phi factor is 1.618. The second wavelength of light is the mathematical product of 400 nm multiplied by 1.618 (a dimensionless quantity). The mathematical product is 647 nm, which is the second wavelength of light. As another example, in some embodiments, the first wavelength of light is 800 nm. In some embodiments, the phi factor is 0.618. The second wavelength of light is the mathematical product of 800 nm multiplied by 0.618 (a dimensionless quantity). The mathematical product is 494 nm, which is the second wavelength of light.

In some embodiments, the calculating the second wavelength of light comprises multiplying the first wavelength of light by a phi factor. As used herein, the term "phi factor"

refers to a product of n times φ, where n is >0 and φ is 1.618+ε, where ε is 0 to 1. In some embodiments, the phi factor is a first phi factor.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, ε is 0.1. In some embodiments, ε is 0.2. In some embodiments, ε is 0.3. In some embodiments, ε is 0.4. In some embodiments, ε is 0.5. In some embodiments, ε is 0.6. In some embodiments, ε is 0.7. In some embodiments, ε is 0.8. In some embodiments, ε is 0.9. In some embodiments, ε is 1. In some embodiments, it will be appreciated that the value of ε is not particularly limited and thus, although values are provided herein, other ε values may be used herein without departing from the scope of this disclosure.

In some embodiments, the second wavelength of light defines a second color. In some embodiments, the second wavelength of light has a wavelength in a range of 400 nm to 800 nm. In some embodiments, the second wavelength of light has a wavelength in a range of 400 nm to 420 nm. In some embodiments, the second wavelength of light has a wavelength in a range of 400 nm to 440 nm. In some embodiments, the second wavelength of light has a wavelength in a range of 400 nm to 490 nm. In some embodiments, the second wavelength of light has a wavelength in a range of 400 nm to 570 nm. In some embodiments, the second wavelength of light has a wavelength in a range of 400 nm to 585 nm. In some embodiments, the second wavelength of light has a wavelength in a range of 400 nm to 620 nm. In some embodiments, the second wavelength of light has a wavelength in a range of 400 nm to 780 nm.

In some embodiments, the second wavelength of light has a wavelength in a range of 420 nm to 780 nm. In some embodiments, the second wavelength of light has a wavelength in a range of 440 nm to 780 nm. In some embodiments, the second wavelength of light has a wavelength in a range of 490 nm to 780 nm. In some embodiments, the second wavelength of light has a wavelength in a range of 570 nm to 780 nm. In some embodiments, the second wavelength of light has a wavelength in a range of 585 nm to 780 nm. In some embodiments, the second wavelength of light has a wavelength in a range of 620 nm to 780 nm.

In some embodiments, the second wavelength of light has a wavelength in a range of 420 nm to 440 nm. In some embodiments, the second wavelength of light has a wavelength in a range of 440 nm to 490 nm. In some embodiments, the second wavelength of light has a wavelength in a range of 490 nm to 570 nm. In some embodiments, the second wavelength of light has a wavelength in a range of 570 nm to 585 nm. In some embodiments, the second wavelength of light has a wavelength in a range of 585 nm to 620 nm. In some embodiments, the second wavelength of light has a wavelength in a range of 620 nm to 780 nm.

At step 106, in some embodiments, the method 100 comprises calculating a third wavelength of light for the building material.

In some embodiments, the calculating the third wavelength of light comprises multiplying the first wavelength of light or the second wavelength of light times a phi factor. In some embodiments, the calculating the third wavelength of light comprises multiplying the second wavelength of light times the phi factor used for calculating the second wavelength of light. In some embodiments, the phi factor used for calculating the second wavelength of light is a first phi factor. In some embodiments, the calculating the third wavelength of light comprises multiply the second wavelength of light times a second phi factor, wherein the second phi factor is different from the first phi factor. In some embodiments, the calculating the third wavelength of light comprises multiplying the first wavelength of light times a second phi factor, wherein the second phi factor is different from the first phi factor. In some embodiments, the first phi factor and the second phi factor are the same. In some embodiments, the first phi factor and the second phi factor are different.

In some embodiments, the second phi factor comprises a product of n times φ, where n is >0 and φ is 1.618±ε, where ε is 0 to 1.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, ε is 0.1. In some embodiments, ε is 0.2. In some embodiments, ε is 0.3. In some embodiments, ε is 0.4. In some embodiments, ε is 0.5. In some embodiments, ε is 0.6. In some embodiments, ε is 0.7. In some embodiments, ε is 0.8. In some embodiments, ε is 0.9. In some embodiments, ε is 1. In some embodiments, it will be appreciated that the value of ε is not particularly limited and thus, although values are provided herein, other ε values may be used herein without departing from the scope of this disclosure.

In some embodiments, the third wavelength of light defines a third color. In some embodiments, the third wavelength of light has a wavelength in a range of 400 nm to 800 nm. In some embodiments, the third wavelength of light has a wavelength in a range of 400 nm to 420 nm. In some embodiments, the third wavelength of light has a wavelength in a range of 400 nm to 440 nm. In some embodiments, the third wavelength of light has a wavelength in a range of 400 nm to 490 nm. In some embodiments, the third wavelength of light has a wavelength in a range of 400 nm to 570 nm. In some embodiments, the third wavelength of light has a wavelength in a range of 400 nm to 585 nm. In some embodiments, the third wavelength of light has a wavelength in a range of 400 nm to 620 nm. In some embodiments, the third wavelength of light has a wavelength in a range of 400 nm to 780 nm.

In some embodiments, the third wavelength of light has a wavelength in a range of 420 nm to 780 nm. In some embodiments, the third wavelength of light has a wavelength in a range of 440 nm to 780 nm. In some embodiments, the third wavelength of light has a wavelength in a range of 490 nm to 780 nm. In some embodiments, the third wavelength of light has a wavelength in a range of 570 nm to 780 nm. In some embodiments, the third wavelength of light has a wavelength in a range of 585 nm to 780 nm. In some embodiments, the third wavelength of light has a wavelength in a range of 620 nm to 780 nm.

In some embodiments, the third wavelength of light has a wavelength in a range of 420 nm to 440 nm. In some embodiments, the third wavelength of light has a wavelength in a range of 440 nm to 490 nm. In some embodiments, the third wavelength of light has a wavelength in a range of 490 nm to 570 nm. In some embodiments, the third wavelength of light has a wavelength in a range of 570 nm to 585 nm. In some embodiments, the third wavelength of light has a wavelength in a range of 585 nm to 620 nm. In some embodiments, the third wavelength of light has a wavelength in a range of 620 nm to 780 nm.

At step 108, in some embodiments, the method 100 comprises producing the building material.

In some embodiments, the producing the building material comprises manufacturing a building material having at least one of the first color, the second color, or any combination thereof. In some embodiments, the producing the building material comprises selecting a building material having at least one of the first color, the second color, or any combination thereof. In some embodiments, the producing the building material comprises constructing a building material having at least one of the first color, the second color, or any combination thereof. In some embodiments, the producing the building material comprises assembling a building material having at least one of the first color, the second color, or any combination thereof. In some embodiments, the producing the building material comprises obtaining a building material having at least one of the first color, the second color, or any combination thereof. In some embodiments, the producing the building material comprises requesting a building material having at least one of the first color, the second color, or any combination thereof. In some embodiments, the producing the building material comprises manufacturing (or custom manufacturing) a building material having at least one of the first color, the second color, or any combination thereof.

In some embodiments, the building material comprises a building material having at least one of the first color, the second color, or any combination thereof. In some embodiments, the building material comprises at least one of a first building material, a second building material, or any combination thereof. In some embodiments, the first building material has the first color. In some embodiments, the second building material has the second color. In some embodiments, the building material comprises a building material having a color blend. In some embodiments, the color blend is a color resulting from a combination of the first color and the second color. In some embodiments, the color blend is a color that is different from at least one of the first color, the second color, or any combination thereof.

Figure 2:
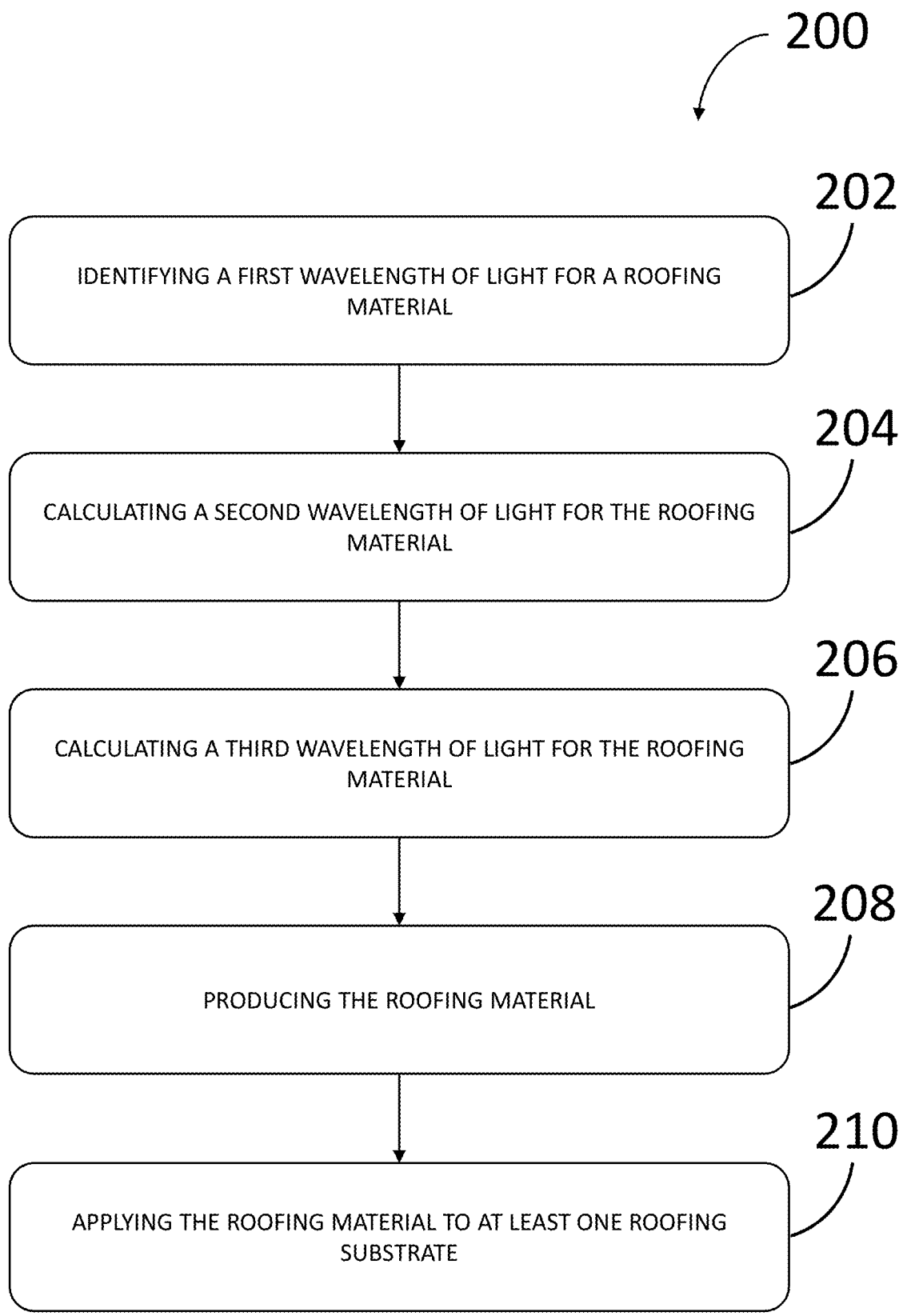
FIG. 2 is a flowchart of a method for producing a roofing material, according to some embodiments.

FIG. 2 is a flowchart of a method for producing a roofing material, according to some embodiments. As shown in FIG. 2, the method 200 for producing the roofing material comprises, consists of, or consists essentially of one or more of the following steps: a step 202 of identifying a first wavelength of light for a roofing material; a step 204 of calculating a second wavelength of light for the roofing material; a step 206 of calculating a third wavelength of light for the roofing material; a step 208 of producing the roofing material; and a step 210 of applying the roofing material to at least one roofing substrate.

At step 202, in some embodiments, the method 200 comprises identifying a first wavelength of light for a roofing material.

In some embodiments, the identifying comprises selecting the first wavelength of light. In some embodiments, the identifying comprises measuring the first wavelength of light. In some embodiments, the identifying comprises detecting the first wavelength of light. In some embodiments, the identifying comprises observing the first wavelength of light. In some embodiments, the identifying comprises requesting the first wavelength of light. In some embodiments, the identifying comprises obtaining the first wavelength of light.

In some embodiments, the first wavelength of light defines a first color. In some embodiments, the first wavelength of light has a wavelength in a range of 400 nm to 800 nm. In some embodiments, the first wavelength of light has a wavelength in a range of 400 nm to 420 nm. In some embodiments, the first wavelength of light has a wavelength in a range of 400 nm to 440 nm. In some embodiments, the first wavelength of light has a wavelength in a range of 400 nm to 490 nm. In some embodiments, the first wavelength of light has a wavelength in a range of 400 nm to 570 nm. In some embodiments, the first wavelength of light has a wavelength in a range of 400 nm to 585 nm. In some embodiments, the first wavelength of light has a wavelength in a range of 400 nm to 620 nm. In some embodiments, the first wavelength of light has a wavelength in a range of 400 nm to 780 nm.

In some embodiments, the first wavelength of light has a wavelength in a range of 420 nm to 780 nm. In some embodiments, the first wavelength of light has a wavelength in a range of 440 nm to 780 nm. In some embodiments, the first wavelength of light has a wavelength in a range of 490 nm to 780 nm. In some embodiments, the first wavelength of light has a wavelength in a range of 570 nm to 780 nm.

In some embodiments, the first wavelength of light has a wavelength in a range of 585 nm to 780 nm. In some embodiments, the first wavelength of light has a wavelength in a range of 620 nm to 780 nm.

In some embodiments, the first wavelength of light has a wavelength in a range of 420 nm to 440 nm. In some embodiments, the first wavelength of light has a wavelength in a range of 440 nm to 490 nm. In some embodiments, the first wavelength of light has a wavelength in a range of 490 nm to 570 nm. In some embodiments, the first wavelength of light has a wavelength in a range of 570 nm to 585 nm. In some embodiments, the first wavelength of light has a wavelength in a range of 585 nm to 620 nm. In some embodiments, the first wavelength of light has a wavelength in a range of 620 nm to 780 nm.

At step 204, in some embodiments, the method 200 comprises calculating a second wavelength of light for the roofing material.

In some embodiments, the calculating the second wavelength of light comprises multiplying the first wavelength of light by a phi factor. In some embodiments, the phi factor is a product of n times $\varphi$, where n is >0 and $\varphi$ is 1.618+$\varepsilon$, where $\varepsilon$ is 0 to 1. In some embodiments, the phi factor is a first phi factor.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, $\varepsilon$ is 0.1. In some embodiments, $\varepsilon$ is 0.2. In some embodiments, $\varepsilon$ is 0.3. In some embodiments, $\varepsilon$ is 0.4. In some embodiments, $\varepsilon$ is 0.5. In some embodiments, $\varepsilon$ is 0.6. In some embodiments, $\varepsilon$ is 0.7. In some embodiments, $\varepsilon$ is 0.8. In some embodiments, $\varepsilon$ is 0.9. In some embodiments, $\varepsilon$ is 1. In some embodiments, it will be appreciated that the value of $\varepsilon$ is not particularly limited and thus, although values are provided herein, other $\varepsilon$ values may be used herein without departing from the scope of this disclosure.

In some embodiments, the second wavelength of light defines a second color. In some embodiments, the second wavelength of light has a wavelength in a range of 400 nm to 800 nm. In some embodiments, the second wavelength of light has a wavelength in a range of 400 nm to 420 nm. In some embodiments, the second wavelength of light has a wavelength in a range of 400 nm to 440 nm. In some embodiments, the second wavelength of light has a wavelength in a range of 400 nm to 490 nm. In some embodiments, the second wavelength of light has a wavelength in a range of 400 nm to 570 nm. In some embodiments, the second wavelength of light has a wavelength in a range of 400 nm to 585 nm. In some embodiments, the second wavelength of light has a wavelength in a range of 400 nm to 620 nm. In some embodiments, the second wavelength of light has a wavelength in a range of 400 nm to 780 nm.

In some embodiments, the second wavelength of light has a wavelength in a range of 420 nm to 780 nm. In some embodiments, the second wavelength of light has a wavelength in a range of 440 nm to 780 nm. In some embodiments, the second wavelength of light has a wavelength in a range of 490 nm to 780 nm. In some embodiments, the second wavelength of light has a wavelength in a range of 570 nm to 780 nm. In some embodiments, the second wavelength of light has a wavelength in a range of 585 nm to 780 nm. In some embodiments, the second wavelength of light has a wavelength in a range of 620 nm to 780 nm.

In some embodiments, the second wavelength of light has a wavelength in a range of 420 nm to 440 nm. In some embodiments, the second wavelength of light has a wavelength in a range of 440 nm to 490 nm. In some embodiments, the second wavelength of light has a wavelength in a range of 490 nm to 570 nm. In some embodiments, the second wavelength of light has a wavelength in a range of 570 nm to 585 nm. In some embodiments, the second wavelength of light has a wavelength in a range of 585 nm to 620 nm. In some embodiments, the second wavelength of light has a wavelength in a range of 620 nm to 780 nm.

At step 206, in some embodiments, the method 200 comprises calculating a third wavelength of light for the roofing material.

In some embodiments, the calculating the third wavelength of light comprises multiplying the first wavelength of light or the second wavelength of light times a phi factor. In some embodiments, the calculating the third wavelength of light comprises multiplying the second wavelength of light times the phi factor used for calculating the second wavelength of light. In some embodiments, the phi factor used for calculating the second wavelength of light is a first phi factor. In some embodiments, the calculating the third wavelength of light comprises multiply the second wavelength of light times a second phi factor, wherein the second phi factor is different from the first phi factor. In some embodiments, the calculating the third wavelength of light comprises multiplying the first wavelength of light times a second phi factor, wherein the second phi factor is different from the first phi factor. In some embodiments, the first phi factor and the second phi factor are the same. In some embodiments, the first phi factor and the second phi factor are different.

In some embodiments, the second phi factor comprises a product of n times $\varphi$, where n is >0 and $\varphi$ is 1.618±$\varepsilon$, where $\varepsilon$ is 0 to 1.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, $\varepsilon$ is 0.1. In some embodiments, $\varepsilon$ is 0.2. In some embodiments, $\varepsilon$ is 0.3. In some embodiments, $\varepsilon$ is 0.4. In some embodiments, $\varepsilon$ is 0.5. In some embodiments, $\varepsilon$ is 0.6. In some embodiments, $\varepsilon$ is 0.7. In some embodiments, $\varepsilon$ is 0.8. In some embodiments, $\varepsilon$ is 0.9. In some embodiments, $\varepsilon$ is 1. In some embodiments, it will be appreciated that the value of $\varepsilon$ is not particularly limited and thus, although values are provided herein, other $\varepsilon$ values may be used herein without departing from the scope of this disclosure.

In some embodiments, the third wavelength of light defines a third color. In some embodiments, the third wavelength of light has a wavelength in a range of 400 nm to 800 nm. In some embodiments, the third wavelength of light has a wavelength in a range of 400 nm to 420 nm. In some embodiments, the third wavelength of light has a wavelength in a range of 400 nm to 440 nm. In some embodiments, the third wavelength of light has a wavelength in a range of 400 nm to 490 nm. In some embodiments, the third wavelength of light has a wavelength in a range of 400 nm to 570 nm. In some embodiments, the third wavelength of light has a wavelength in a range of 400 nm to 585 nm. In some embodiments, the third wavelength of light has a wavelength in a range of 400 nm to 620 nm. In some embodiments, the third wavelength of light has a wavelength in a range of 400 nm to 780 nm.

In some embodiments, the third wavelength of light has a wavelength in a range of 420 nm to 780 nm. In some embodiments, the third wavelength of light has a wavelength in a range of 440 nm to 780 nm. In some embodiments, the third wavelength of light has a wavelength in a range of 490 nm to 780 nm. In some embodiments, the third wavelength of light has a wavelength in a range of 570 nm to 780 nm. In some embodiments, the third wavelength of light has a wavelength in a range of 585 nm to 780 nm. In some embodiments, the third wavelength of light has a wavelength in a range of 620 nm to 780 nm.

In some embodiments, the third wavelength of light has a wavelength in a range of 420 nm to 440 nm. In some embodiments, the third wavelength of light has a wavelength in a range of 440 nm to 490 nm. In some embodiments, the third wavelength of light has a wavelength in a range of 490 nm to 570 nm. In some embodiments, the third wavelength of light has a wavelength in a range of 570 nm to 585 nm. In some embodiments, the third wavelength of light has a wavelength in a range of 585 nm to 620 nm. In some embodiments, the third wavelength of light has a wavelength in a range of 620 nm to 780 nm.

At step 208, in some embodiments, the method 200 comprises producing the roofing material.

In some embodiments, the producing the roofing material comprises manufacturing a roofing material having at least one of the first color, the second color, the third color, or any combination thereof. In some embodiments, the producing the roofing material comprises selecting a roofing material having at least one of the first color, the second color, the third color, or any combination thereof. In some embodiments, the producing the roofing material comprises constructing a roofing material having at least one of the first color, the second color, the third color, or any combination thereof. In some embodiments, the producing the roofing material comprises assembling a roofing material having at least one of the first color, the second color, the third color, or any combination thereof. In some embodiments, the producing the roofing material comprises obtaining a roofing material having at least one of the first color, the second color, the third color, or any combination thereof. In some embodiments, the producing the roofing material comprises requesting a roofing material having at least one of the first color, the second color, the third color, or any combination thereof. In some embodiments, the producing the roofing material comprises manufacturing (e.g., custom manufacturing) a roofing material having at least one of the first color, the second color, the third color, or any combination thereof. In some embodiments, the producing the roofing material comprises producing a plurality of roofing granules. Non-limiting examples of producing a plurality of roofing granules are detailed in U.S. application Ser. No. 16/675,020, and U.S. Pat. Nos. 9,442,219, 11,053,684, all of which are hereby incorporated by reference in their entirety.

In some embodiments, the roofing material comprises a plurality of roofing granules. In some embodiments, the plurality of roofing granules has at least one of the first color, the second color, the third color, or any combination thereof. In some embodiments, the plurality of roofing granules comprises at least one of a first plurality of roofing granules, a second plurality of roofing granules, a third plurality of roofing granules, or any combination thereof. In some embodiments, the first plurality of roofing granules has the first color. In some embodiments, the second plurality of roofing granules has the second color. In some embodiments, the third plurality of roofing granules has the third color. In some embodiments, the plurality of roofing granules has a color blend. In some embodiments, the color blend is a color resulting from a combination of at least two of the first color, the second color, the third color, or any combination thereof. In some embodiments, the color blend is a color that is different from at least one of the first color, the second color, the third color, or any combination thereof.

In some embodiments, the roofing granule comprises, consists of, or consists essentially of at least one of fines, granules, sand, metal flakes, reflective granules, ceramic granules, clay granules, composite particles comprising filled plastics (e.g., composite particles made with highly filled plastics), polymer-based granules, or any combination thereof. In some embodiments, the roofing granule comprises, consists of, or consists essentially of at least one of greenstone, nephelene syenite, common gravel, slate, ganister, quartz, quartzite, greystone, argillite, coal slag, copper slag, nickel slag, ceramic grog, talc, granite, siliceous sand, andesite, porphyry, marble, syenite, rhyolite, diabase, quartz, slate, basalt, sandstone, marine shell, a material derived from a recycled manufactured good (e.g., at least one of a brick, a concrete, a porcelain, or any combination thereof), or any combination thereof. In some embodiments, the roofing granule comprises, consists of, or consists essentially of a shape of or may comprise a shape resembling a sphere, a flake, a plate, a rod, or any combination thereof.

At step 210, in some embodiments, the method 200 comprises applying the roofing material to at least one roofing substrate.

In some embodiments, the method 200 further comprises applying the plurality of roofing granules to at least one roofing substrate. In some embodiments, the applying comprises disposing on the at least one roofing substrate, on a coating on the at least one roofing substrate, or any combination thereof using a substantially standard manufacturing line. A non-limiting example of a substantially standard manufacturing line for asphaltic shingles is detailed in U.S. Pat. No. 10,195,640 the contents of which are hereby incorporated by reference in its entirety. Other non-limiting example of applying granules are detailed in U.S. Pat. Nos. 10,392,805, 9,498,795, 8,530,034, all of which are hereby incorporated by reference in their entirety. In some embodiments, the method 200 comprises applying at least one of the first plurality of roofing granules, the second plurality of roofing granules, the third plurality of roofing granules, or any combination thereof to at least one roofing substrate. In some embodiments, the at least one roofing substrate comprises at least one of the following: at least a portion of the first plurality of roofing granules having the first color, at least a portion of the second plurality of roofing granules having the second color, at least a portion of the third plurality of roofing granules having the third color, or any combination thereof.

In some embodiments, the method 200 further comprises applying the plurality of roofing granules to at least one of a first roofing substrate, a second roofing substrate, a third roofing substrate, or any combination thereof. In some embodiments, the method 200 further comprises applying the first plurality of roofing granules having the first color to the first roofing substrate. In some embodiments, the method 200 further comprises applying the second plurality of roofing granules having the second color to the second roofing substrate. In some embodiments, the method 200 further comprises applying the third plurality of roofing granules having the third color to the third roofing substrate.

In some embodiments, the first roofing substrate does not comprise the second plurality of roofing granules having the second color. In some embodiments, the first roofing substrate does not comprise the third plurality of roofing granules having the third color. In some embodiments, the second roofing substrate does not comprise the first plurality of roofing granules having the first color. In some embodiments, the second roofing substrate does not comprise the third plurality of roofing granules having the third color. In some embodiments, the third roofing substrate does not comprise the first plurality of roofing granules having the first color. In some embodiments, the third roofing substrate does not comprise the second plurality of roofing granules having the second color.

In some embodiments, the method 200 further comprises applying the plurality of roofing granules having the color blend to at least one roofing substrate. In some embodiments, the color blend comprises, consists of, or consists essentially of the first color and the second color. In some embodiments, the color blend comprises, consists of, or consists essentially of the first color and the third color. In some embodiments, the color blend comprises, consists of, or consists essentially of the second color and the third color. In some embodiments, the color blend comprises, consists of, or consists essentially of first color, the second color, and the third color. In some embodiments, the color blend is different from at least one of the first color, the second color, the third color, or any combination thereof.

In some embodiments, the at least one roofing substrate comprises at least one of a plywood substrate, a glass substrate, a cellulosic substrate, a roof shingle, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the substrate comprises asphalt (e.g., an asphalt coating, an asphalt-filled coating, and the like). In some embodiments, the substrate does not comprise asphalt (e.g., 0% by weight of asphalt based on a total weight of the substrate).

Figure 3:
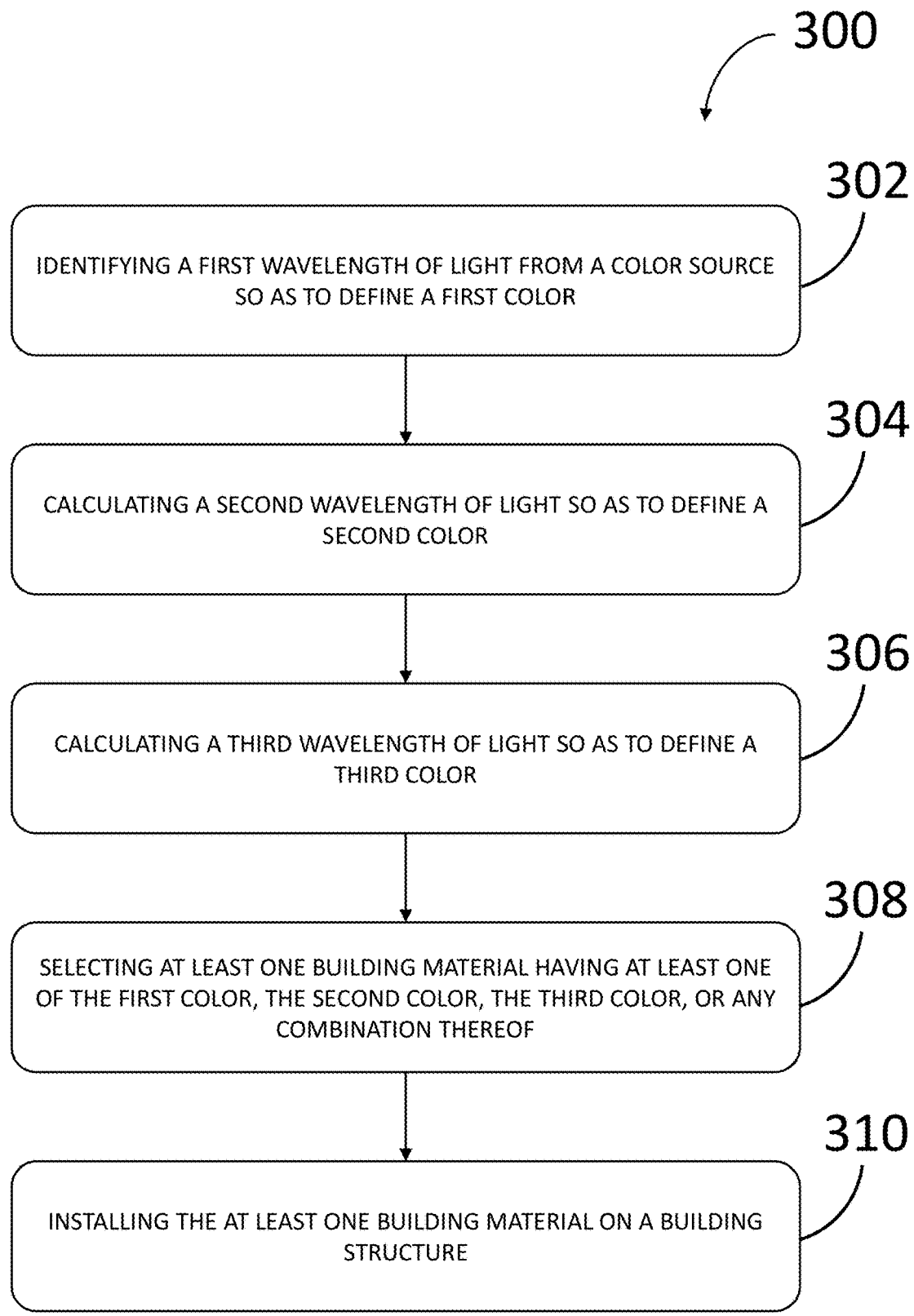
FIG. 3 is a flowchart of a method for color matching a building material, according to some embodiments.

FIG. 3 is a flowchart of a method for color matching a building material, according to some embodiments. As shown in FIG. 3, the method 300 for color matching a building material comprises, consists of, or consists essentially of one or more of the following steps: a step 302 of identifying a first wavelength of light from a color source so as to define a first color; a step 304 of calculating a second wavelength of light so as to define a second color; a step 306 of calculating a third wavelength of light so as to define a third color; a step 308 of selecting at least one building material having at least one of the first color, the second color, the third color, or any combination thereof; and a step 310 of installing the at least one building material on a building structure.

At step 302, in some embodiments, the method 300 comprises identifying a first wavelength of light from a color source.

As used herein, the term "color source" refers to a material having at least one color. In some embodiments, the color source is at least one building material. In some embodiments, the color source is at least one roofing material. In some embodiments, the color source is a sheet comprising one or more colors. In some embodiments, the color source is a color swatch. In some embodiments, the color source is a color palette. In some embodiments, the color source is a building material. For example, in some embodiments, the color source is a first building material comprising at least one of a first roofing shingle, a first roofing granule, a first solar roofing panel, a first shutter, a first siding, a first wall, a first trim, any component thereof, or any combination thereof. In some embodiments, it will be appreciated that other materials having at least one color may be used herein without departing from the scope of this disclosure.

In some embodiments, the identifying comprises determining the first wavelength of light. In some embodiments, the identifying comprises measuring the first wavelength of light. In some embodiments, the identifying comprises detecting the first wavelength of light. In some embodiments, the identifying comprises obtaining the first wavelength of light. In some embodiments, the identifying comprises requesting the first wavelength of light. In some embodiments, the identifying comprises selecting the first wavelength of light. In some embodiments, the identifying comprises observing the first wavelength of light. In some embodiments, the identifying comprises selecting a first color and at least one of determining, measuring, observing, detecting, requesting, obtaining, or any combination thereof the first wavelength of light based on the selected first color. In some embodiments, the identifying comprises selecting a first color from a color source and determining the first wavelength of light associated with the selected first color. In some embodiments, the first wavelength of light associated with the selected first color is determined by measuring a first wavelength of light of at least one of the selected first color, the color swatch, the color palette, the first building material, or any combination thereof to obtain a first measured wavelength.

In some embodiments, the determining (e.g., measuring) is performed using at least one of colorimeter, a spectrophotometer, or any combination thereof. In some embodiments, the first measured wavelength of light is within 25% of the first wavelength of light. In some embodiments, the first measured wavelength of light is within 20% of the first wavelength of light. In some embodiments, the first measured wavelength of light is within 15% of the first wavelength of light. In some embodiments, the first measured wavelength of light is within 10% of the first wavelength of light. In some embodiments, the first measured wavelength of light is within 5% of the first wavelength of light. In some embodiments, the first measured wavelength of light is within 1% of the first wavelength of light.

In some embodiments, the first wavelength of light defines a first color. In some embodiments, the first wavelength of light has a wavelength in a range of 400 nm to 800 nm. In some embodiments, the first wavelength of light has a wavelength in a range of 400 nm to 420 nm. In some embodiments, the first wavelength of light has a wavelength in a range of 400 nm to 440 nm. In some embodiments, the first wavelength of light has a wavelength in a range of 400 nm to 490 nm. In some embodiments, the first wavelength of light has a wavelength in a range of 400 nm to 570 nm. In some embodiments, the first wavelength of light has a wavelength in a range of 400 nm to 585 nm. In some embodiments, the first wavelength of light has a wavelength in a range of 400 nm to 620 nm. In some embodiments, the first wavelength of light has a wavelength in a range of 400 nm to 780 nm.

In some embodiments, the first wavelength of light has a wavelength in a range of 420 nm to 780 nm. In some embodiments, the first wavelength of light has a wavelength in a range of 440 nm to 780 nm. In some embodiments, the first wavelength of light has a wavelength in a range of 490 nm to 780 nm. In some embodiments, the first wavelength of light has a wavelength in a range of 570 nm to 780 nm. In some embodiments, the first wavelength of light has a wavelength in a range of 585 nm to 780 nm. In some embodiments, the first wavelength of light has a wavelength in a range of 620 nm to 780 nm.

In some embodiments, the first wavelength of light has a wavelength in a range of 420 nm to 440 nm. In some embodiments, the first wavelength of light has a wavelength in a range of 440 nm to 490 nm. In some embodiments, the first wavelength of light has a wavelength in a range of 490 nm to 570 nm. In some embodiments, the first wavelength of light has a wavelength in a range of 570 nm to 585 nm. In some embodiments, the first wavelength of light has a wavelength in a range of 585 nm to 620 nm. In some embodiments, the first wavelength of light has a wavelength in a range of 620 nm to 780 nm.

At step 304, in some embodiments, the method 300 comprises calculating a second wavelength of light.

In some embodiments, the calculating the second wavelength of light comprises multiplying the first wavelength of light by a phi factor. In some embodiments, the phi factor is a first phi factor.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, $\varepsilon$ is 0.1. In some embodiments, $\varepsilon$ is 0.2. In some embodiments, $\varepsilon$ is 0.3. In some embodiments, $\varepsilon$ is 0.4. In some embodiments, $\varepsilon$ is 0.5. In some embodiments, $\varepsilon$ is 0.6. In some embodiments, $\varepsilon$ is 0.7. In some embodiments, $\varepsilon$ is 0.8. In some embodiments, $\varepsilon$ is 0.9. In some embodiments, $\varepsilon$ is 1. In some embodiments, it will be appreciated that the value of $\varepsilon$ is not particularly limited and thus, although values are provided herein, other $\varepsilon$ values may be used herein without departing from the scope of this disclosure.

In some embodiments, the second wavelength of light defines a second color. In some embodiments, the second wavelength of light has a wavelength in a range of 400 nm to 800 nm. In some embodiments, the second wavelength of light has a wavelength in a range of 400 nm to 420 nm. In some embodiments, the second wavelength of light has a wavelength in a range of 400 nm to 440 nm. In some embodiments, the second wavelength of light has a wavelength in a range of 400 nm to 490 nm. In some embodiments, the second wavelength of light has a wavelength in a range of 400 nm to 570 nm. In some embodiments, the second wavelength of light has a wavelength in a range of 400 nm to 585 nm. In some embodiments, the second wavelength of light has a wavelength in a range of 400 nm to 620 nm. In some embodiments, the second wavelength of light has a wavelength in a range of 400 nm to 780 nm.

In some embodiments, the second wavelength of light has a wavelength in a range of 420 nm to 780 nm. In some embodiments, the second wavelength of light has a wavelength in a range of 440 nm to 780 nm. In some embodiments, the second wavelength of light has a wavelength in a range of 490 nm to 780 nm. In some embodiments, the second wavelength of light has a wavelength in a range of 570 nm to 780 nm. In some embodiments, the second wavelength of light has a wavelength in a range of 585 nm to 780 nm. In some embodiments, the second wavelength of light has a wavelength in a range of 620 nm to 780 nm.

In some embodiments, the second wavelength of light has a wavelength in a range of 420 nm to 440 nm. In some embodiments, the second wavelength of light has a wavelength in a range of 440 nm to 490 nm. In some embodiments, the second wavelength of light has a wavelength in a range of 490 nm to 570 nm. In some embodiments, the second wavelength of light has a wavelength in a range of 570 nm to 585 nm. In some embodiments, the second wavelength of light has a wavelength in a range of 585 nm to 620 nm. In some embodiments, the second wavelength of light has a wavelength in a range of 620 nm to 780 nm.

At step 306, in some embodiments, the method 300 comprises calculating a third wavelength of light.

In some embodiments, the calculating the third wavelength of light comprises multiplying the first wavelength of light or the second wavelength of light times a phi factor. In some embodiments, the calculating the third wavelength of light comprises multiplying the second wavelength of light times the phi factor used for calculating the second wavelength of light. In some embodiments, the phi factor used for calculating the second wavelength of light is a first phi factor. In some embodiments, the calculating the third wavelength of light comprises multiply the second wavelength of light times a second phi factor, wherein the second phi factor is different from the first phi factor. In some embodiments, the calculating the third wavelength of light comprises multiplying the first wavelength of light times a second phi factor, wherein the second phi factor is different from the first phi factor. In some embodiments, the first phi factor and the second phi factor are the same. In some embodiments, the first phi factor and the second phi factor are different.

In some embodiments, the second phi factor comprises a product of n times $\varphi$, where n is >0 and @ is 1.618±ε, where ε is 0 to 1.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, ε is 0.1. In some embodiments, ε is 0.2. In some embodiments, ε is 0.3. In some embodiments, ε is 0.4. In some embodiments, ε is 0.5. In some embodiments, ε is 0.6. In some embodiments, ε is 0.7. In some embodiments, ε is 0.8. In some embodiments, ε is 0.9. In some embodiments, ε is 1. In some embodiments, it will be appreciated that the value of ε is not particularly limited and thus, although values are provided herein, other ε values may be used herein without departing from the scope of this disclosure.

In some embodiments, the third wavelength of light defines a third color. In some embodiments, the third wavelength of light has a wavelength in a range of 400 nm to 800 nm. In some embodiments, the third wavelength of light has a wavelength in a range of 400 nm to 420 nm. In some embodiments, the third wavelength of light has a wavelength in a range of 400 nm to 440 nm. In some embodiments, the third wavelength of light has a wavelength in a range of 400 nm to 490 nm. In some embodiments, the third wavelength of light has a wavelength in a range of 400 nm to 570 nm. In some embodiments, the third wavelength of light has a wavelength in a range of 400 nm to 585 nm. In some embodiments, the third wavelength of light has a wavelength in a range of 400 nm to 620 nm. In some embodiments, the third wavelength of light has a wavelength in a range of 400 nm to 780 nm.

In some embodiments, the third wavelength of light has a wavelength in a range of 420 nm to 780 nm. In some embodiments, the third wavelength of light has a wavelength in a range of 440 nm to 780 nm. In some embodiments, the third wavelength of light has a wavelength in a range of 490 nm to 780 nm. In some embodiments, the third wavelength of light has a wavelength in a range of 570 nm to 780 nm. In some embodiments, the third wavelength of light has a wavelength in a range of 585 nm to 780 nm. In some embodiments, the third wavelength of light has a wavelength in a range of 620 nm to 780 nm.

In some embodiments, the third wavelength of light has a wavelength in a range of 420 nm to 440 nm. In some embodiments, the third wavelength of light has a wavelength in a range of 440 nm to 490 nm. In some embodiments, the third wavelength of light has a wavelength in a range of 490 nm to 570 nm. In some embodiments, the third wavelength of light has a wavelength in a range of 570 nm to 585 nm. In some embodiments, the third wavelength of light has a wavelength in a range of 585 nm to 620 nm. In some embodiments, the third wavelength of light has a wavelength in a range of 620 nm to 780 nm.

At step 308, in some embodiments, the method 300 comprises selecting at least one building material having at least one of the first color, the second color, the third color, or any combination thereof.

In some embodiments, the selecting comprises having a person select at least one building material having at least one of the first color, the second color, the third color, or any combination thereof. In some embodiments, the selecting comprises having a color matching algorithm select at least one building material having at least one of the first color, the second color, the third color, or any combination thereof. In some embodiments, the selecting comprises obtaining at least one building material having at least one of the first color, the second color, the third, color, or any combination thereof. In some embodiments, the selecting comprises manufacturing at least one building material having at least one of the first color, the second color, the third, color, or any combination thereof. In some embodiments, the selecting comprises selecting at least one building material having at least one of the first color, the second color, the third color, or any combination thereof. In some embodiments, the selecting comprises constructing at least one building material having at least one of the first color, the second color, the third color, or any combination thereof. In some embodiments, the selecting comprises assembling at least one building material having at least one of the first color, the second color, the third color, or any combination thereof. In some embodiments, the selecting comprises requesting at least one building material having at least one of the first color, the second color, the third color, or any combination thereof. In some embodiments, the selecting comprises custom manufacturing at least one building material having at least one of the first color, the second color, the third color, or any combination thereof.

In some embodiments, the at least one building material comprises, consists of, or consists essentially of at least one of the first building material, the second building material, the third building material, or any combination thereof.

In some embodiments, the at least one building material comprises, consists of, or consists essentially of a first building material having the first color. In some embodiments, the first building material having the first color comprises, consists of, or consists essentially of at least one of a first roofing shingle, a first roofing granule, a first solar roofing panel, a first shutter, a first siding, a first wall, a first trim, any component thereof, or any combination thereof.

In some embodiments, the at least one building material comprises, consists of, or consists essentially of a second building material having the second color. In some embodiments, the second building material having the second color comprises, consists of, or consists essentially of at least one of a second roofing shingle, a second roofing granule, a second solar roofing panel, a second shutter, a second siding, a second wall, a second trim, any component thereof, or any combination thereof.

In some embodiments, the at least one building material comprises, consists of, or consists essentially of a third building material having the third color. In some embodiments, the third building material having the third color comprises, consists of, or consists essentially of at least one of a third roofing shingle, a third roofing granule, a third solar roofing panel, a third shutter, a third siding, a third wall, a third trim, any component thereof, or any combination thereof.

At step 310, in some embodiments, the method 300 comprises installing the at least one building material on a building structure.

In some embodiments, the installing comprises mounting the at least one building material to the building structure. In some embodiments, the installing comprises fastening the at least one building material to the building structure. In some embodiments, the installing securing comprises the at least one building material to the building structure. In some embodiments, the installing comprises attaching the at least one building material to the building structure. In some embodiments, the installing comprises inserting the at least one building material on the building structure. In some embodiments, the installing comprises the at least one building material to the building structure. In some embodiments, the installing comprises adhering the at least one building material to the building structure. In some embodiments, at least one of nails, screws, staples, adhesive, any combination thereof, or other similar mechanical components is used for the installing.

In some embodiments, the at least one building material comprises, consists of, or consists essentially of at least one of the first roofing shingle, the first roofing granule, the first solar roofing panel, the first shutter, the first siding, the first wall, the first trim, the second roofing shingle, the second roofing granule, the second solar roofing panel, the second shutter, the second siding, the second wall, the second trim, the third roofing shingle, the third roofing granule, the third solar roofing panel, the third shutter, the third siding, the third wall, the third trim, any component thereof, or any combination thereof on the building structure. In some embodiments, the building structure is a residential building. In some embodiments, the building structure is a commercial building. In some embodiments, the building structure is an industrial building.

In some embodiments, the at least one building material having the first color has a first measured wavelength of light within 10% (e.g., 0.1% to 10%) of the first wavelength of light. In some embodiments, the at least one building material having the first color has a first measured wavelength of light within 9% of the first wavelength of light. In some embodiments, the at least one building material having the first color has a first measured wavelength of light within 8% of the first wavelength of light. In some embodiments, the at least one building material having the first color has a first measured wavelength of light within 7% of the first wavelength of light. In some embodiments, the at least one building material having the first color has a first measured wavelength of light within 6% of the first wavelength of light. In some embodiments, the at least one building material having the first color has a first measured wavelength of light within 5% of the first wavelength of light. In some embodiments, the at least one building material having the first color has a first measured wavelength of light within 4% of the first wavelength of light. In some embodiments, the at least one building material having the first color has a first measured wavelength of light within 3% of the first wavelength of light. In some embodiments, the at least one building material having the first color has a first measured wavelength of light within 2% of the first wavelength of light. In some embodiments, the at least one building material having the first color has a first measured wavelength of light within 1% of the first wavelength of light. In some embodiments, the at least one building material having the first color has a first measured wavelength of light that is the same as the first wavelength of light.

In some embodiments, the at least one building material having the second color has a second measured wavelength of light within 10% (e.g., 0.1% to 10%) of the second wavelength of light. In some embodiments, the at least one building material having the second color has a second measured wavelength of light within 9% of the second wavelength of light. In some embodiments, the at least one building material having the second color has a second measured wavelength of light within 8% of the second wavelength of light. In some embodiments, the at least one building material having the second color has a second measured wavelength of light within 7% of the second wavelength of light. In some embodiments, the at least one building material having the second color has a second measured wavelength of light within 6% of the second wavelength of light. In some embodiments, the at least one building material having the second color has a second measured wavelength of light within 5% of the second wavelength of light. In some embodiments, the at least one building material having the second color has a second measured wavelength of light within 4% of the second wavelength of light. In some embodiments, the at least one building material having the second color has a second measured wavelength of light within 3% of the second wavelength of light. In some embodiments, the at least one building material having the second color has a second measured wavelength of light within 2% of the second wavelength of light. In some embodiments, the at least one building material having the second color has a second measured wavelength of light within 1% of the second wavelength of light. In some embodiments, the at least one building material having the second color has a second measured wavelength of light that is the same as the second wavelength of light.

In some embodiments, the at least one building material having the third color has a third measured wavelength of light within 10% (e.g., 0.1% to 10%) of the third wavelength of light. In some embodiments, the at least one building material having the third color has a third measured wavelength of light within 9% of the third wavelength of light. In some embodiments, the at least one building material having the third color has a third measured wavelength of light within 8% of the third wavelength of light. In some embodiments, the at least one building material having the third color has a third measured wavelength of light within 7% of the third wavelength of light. In some embodiments, the at least one building material having the third color has a third measured wavelength of light within 6% of the third wavelength of light. In some embodiments, the at least one building material having the third color has a third measured wavelength of light within 5% of the third wavelength of light. In some embodiments, the at least one building material having the third color has a third measured wavelength of light within 4% of the third wavelength of light. In some embodiments, the at least one building material having the third color has a third measured wavelength of light within 3% of the third wavelength of light. In some embodiments, the at least one building material having the third color has a third measured wavelength of light within 2% of the third wavelength of light. In some embodiments, the at least one building material having the third color has a third measured wavelength of light within 1% of the third wavelength of light. In some embodiments, the at least one building material having the third color has a third measured wavelength of light that is the same as the third wavelength of light.

Figure 4:
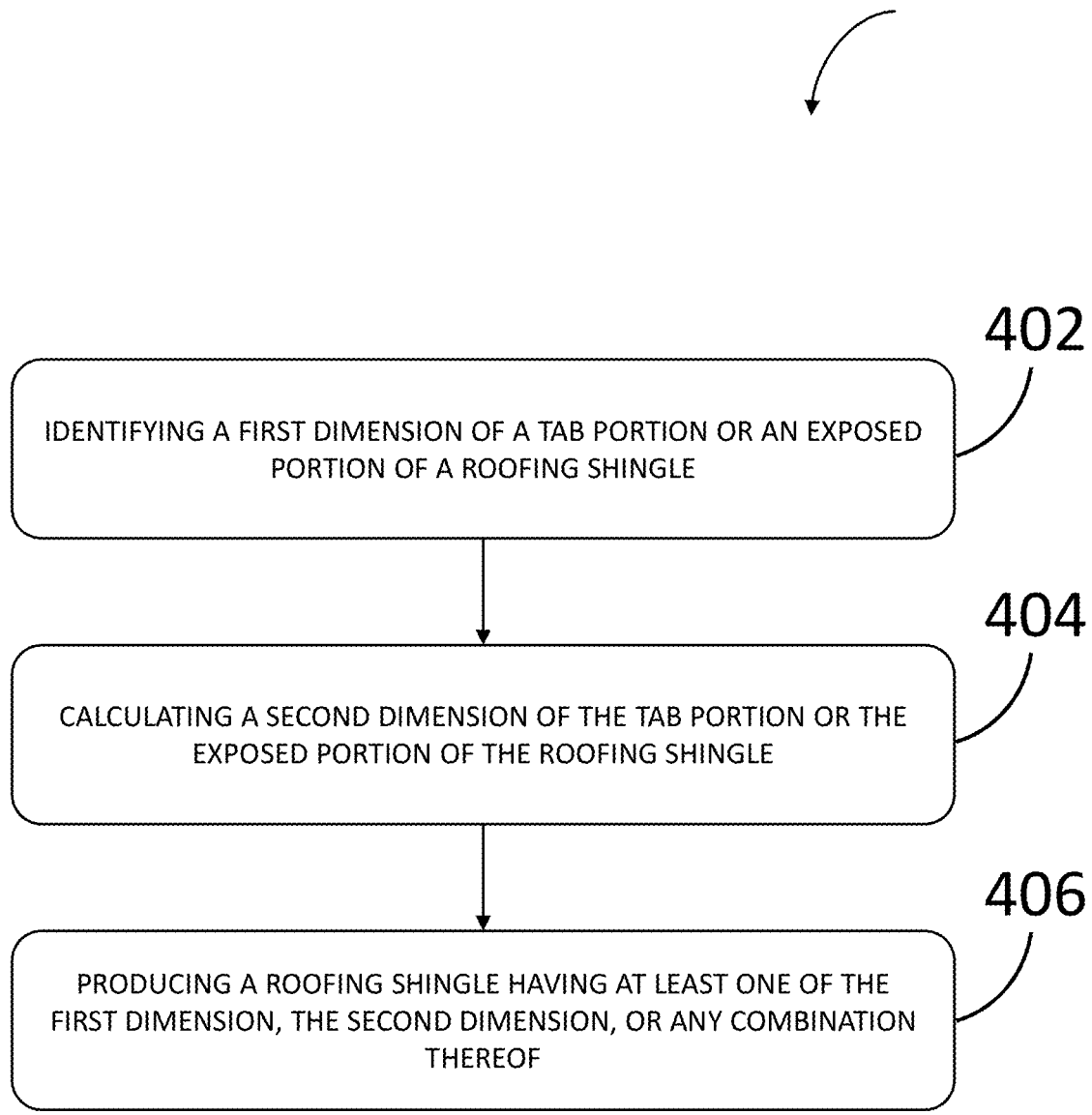
FIG. 4 is a flowchart of a method for producing a roofing shingle, according to some embodiments.

FIG. 4 is a flowchart of a method for producing a roofing shingle, according to some embodiments. As shown in FIG. 4, the method 400 for producing the roofing shingle comprises, consists of, or consists essentially of one or more of the following steps: a step 402 of identifying a first dimension of a tab portion or an exposed portion of a roofing shingle; a step 404 of calculating a second dimension of the tab portion or the exposed portion of the roofing shingle; and a step 406 of producing a roofing shingle having at least one of the first dimension, the second dimension, or any combination thereof.

At step 402, in some embodiments, the method 400 comprises identifying a first dimension of a tab portion or an exposed portion of a roofing shingle.

In some embodiments, the identifying comprises measuring a first dimension of a tab portion or an exposed portion of a roofing shingle. In some embodiments, the identifying comprises selecting a first dimension of a tab portion or an exposed portion of a roofing shingle. In some embodiments, the identifying comprises calculating a first dimension of a tab portion or an exposed portion of a roofing shingle. In some embodiments, the identifying comprises approximating a first dimension of a tab portion or an exposed portion of a roofing shingle. In some embodiments, the identifying comprises acquiring a first dimension of a tab portion or an exposed portion of a roofing shingle. In some embodiments, the identifying comprises receiving a first dimension of a tab portion or an exposed portion of a roofing shingle. In some embodiments, the identifying comprises obtaining a first dimension of a tab portion or an exposed portion of a roofing shingle.

In some embodiments, the first dimension comprises or is selected from the group consisting of at least one of a length of the tab portion, a length of the exposed portion, a width of the tab portion, a width of the exposed portion, a surface area of the tab portion, a surface area of the exposed portion, or any combination thereof. In some embodiments, the first dimension comprises a length of the tab portion. In some embodiments, the first dimension comprises a length of the exposed portion. In some embodiments, the first dimension comprises a width of the tab portion. In some embodiments, the first dimension comprises a width of the exposed portion. In some embodiments, the first dimension comprises a surface area of the tab portion. In some embodiments, the first dimension comprises a surface area of the exposed portion.

At step 404, in some embodiments, the method 400 comprises calculating a second dimension of the tab portion or the exposed portion of the roofing shingle.

In some embodiments, the calculating the second dimension of the tab portion or the exposed portion of the roofing shingle comprises multiplying the first dimension by a phi factor. In some embodiments, the phi factor is a product of n times $\varphi$, where n is >0 and $\varphi$ is 1.618±ε, where ε is 0 to 1.

In some embodiments, n is a number in a range of 0.1 to 100. In some embodiments, n is 0.1. In some embodiments, n is 0.2. In some embodiments, n is 0.3. In some embodiments, n is 0.4. In some embodiments, n is 0.5. In some embodiments, n is 0.6. In some embodiments, n is 0.7. In some embodiments, n is 0.8. In some embodiments, n is 0.9. In some embodiments, n is 1. In some embodiments, n is 1.1. In some embodiments, n is 1.2. In some embodiments, n is 1.3. In some embodiments, n is 1.4. In some embodiments, n is 1.5. In some embodiments, n is 1.6. In some embodiments, n is 1.7. In some embodiments, n is 1.8. In some embodiments, n is 1.9. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10. In some embodiments, n is 15. In some embodiments, n is 20. In some embodiments, n is 25. In some embodiments, n is 30. In some embodiments, n is 35. In some embodiments, n is 40. In some embodiments, n is 45. In some embodiments, n is 50. In some embodiments, n is 55. In some embodiments, n is 60. In some embodiments, n is 70. In some embodiments, n is 80. In some embodiments, n is 90. In some embodiments, n is 100. In some embodiments, it will be appreciated that the value of n is not particularly limited and thus, although values are provided herein, other n values may be used herein without departing from the scope of this disclosure.

In some embodiments, ε is 0.1. In some embodiments, ε is 0.2. In some embodiments, ε is 0.3. In some embodiments, ε is 0.4. In some embodiments, ε is 0.5. In some embodiments, ε is 0.6. In some embodiments, ε is 0.7. In some embodiments, ε is 0.8. In some embodiments, ε is 0.9. In some embodiments, ε is 1. In some embodiments, it will be appreciated that the value of ε is not particularly limited and thus, although values are provided herein, other ε values may be used herein without departing from the scope of this disclosure.

In some embodiments, the second dimension comprises or is selected from the group consisting of at least one of a length of the tab portion, a length of the exposed portion, a width of the tab portion, a width of the exposed portion, a surface area of the tab portion, a surface area of the exposed portion, or any combination thereof. In some embodiments, the second dimension comprises a length of the tab portion. In some embodiments, the second dimension comprises a length of the exposed portion. In some embodiments, the second dimension comprises a width of the tab portion. In some embodiments, the second dimension comprises a width of the exposed portion. In some embodiments, second first dimension comprises a surface area of the tab portion. In some embodiments, the second dimension comprises a surface area of the exposed portion.

In some embodiments, the second dimension is a dimension that is different from the first dimension. For example, in some embodiments, when the first dimension is the length of the tab portion, the second dimension is the width of the tab portion. In some embodiments, when the first dimension is the width of the tab portion, the second dimension is the length of the tab portion. In some embodiments, when the first dimension is the length of the exposed portion, the second dimension is the width of the exposed portion. In some embodiments, when the first dimension is the width of the exposed portion, the second dimension is the length of the exposed portion. In some embodiments, when the first dimension is the surface area of the tab portion, the second dimension is the surface area of the exposed portion. In some embodiments, when the first dimension is the surface area of the exposed portion, the second dimension is the surface area of the tab portion.

At step 406, in some embodiments, the method 400 comprises producing a roofing shingle having at least one of the first dimension, the second dimension, or any combination thereof.

In some embodiments, the producing the roofing shingle comprises constructing a roofing shingle having at least one of the first dimension, the second dimension, or any combination thereof. In some embodiments, the producing the roofing shingle comprises assembling a roofing shingle having at least one of the first dimension, the second dimension, or any combination thereof. In some embodiments, the producing the roofing shingle comprises manufacturing a roofing shingle having at least one of the first dimension, the second dimension, or any combination thereof. In some embodiments, the producing the roofing shingle comprises custom manufacturing a roofing shingle having at least one of the first dimension, the second dimension, or any combination thereof. In some embodiments, the producing the roofing shingle comprises selecting a roofing shingle having at least one of the first dimension, the second dimension, or any combination thereof. In some embodiments, the producing the roofing shingle comprises obtaining a roofing shingle having at least one of the first dimension, the second dimension, or any combination thereof. In some embodiments, the producing the roofing shingle comprises requesting a roofing shingle having at least one of the first dimension, the second dimension, or any combination thereof.

In some embodiments, the roofing shingle that is produced is a roofing shingle having the tab portion having the first dimension and the second dimension. For example, in some embodiments, the roofing shingle having the first dimension and the second dimension is a roofing shingle having the length of the tab portion and the width of the tab portion, respectively. In some embodiments, the roofing shingle having the first dimension and the second dimension is a roofing shingle having the width of the tab portion and the length of the tab portion, respectively.

In some embodiments, the roofing shingle that is produced is a roofing shingle having the exposed portion having the first dimension and the second dimension. For example, in some embodiments, the roofing shingle having the first dimension and the second dimension is a roofing shingle having the length of the exposed portion and the width of the exposed portion, respectively. In some embodiments, the roofing shingle having the first dimension and the second dimension is a roofing shingle having the width of the exposed portion and the length of the exposed portion, respectively.

In some embodiments, the roofing shingle that is produced is a roofing shingle having a tab portion having the first dimension and an exposed portion having the second dimension. In some embodiments, the roofing shingle that is produced is a roofing shingle having an exposed portion having the first dimension and a tab portion having the second dimension. In some embodiments, the roofing shingle having the first dimension and the second dimension is a roofing shingle having the surface area of the tab portion and the surface area of the exposed portion, respectively. In some embodiments, the roofing shingle having the first dimension and the second dimension is a roofing shingle having the surface area of the exposed portion and the surface area of the tab portion, respectively. In some embodiments, when the first dimension is the surface area of the tab portion, the second dimension is the surface area of the exposed portion. In some embodiments, when the first dimension is the surface area of the exposed portion, the second dimension is the surface area of the tab portion.

Figure 5:
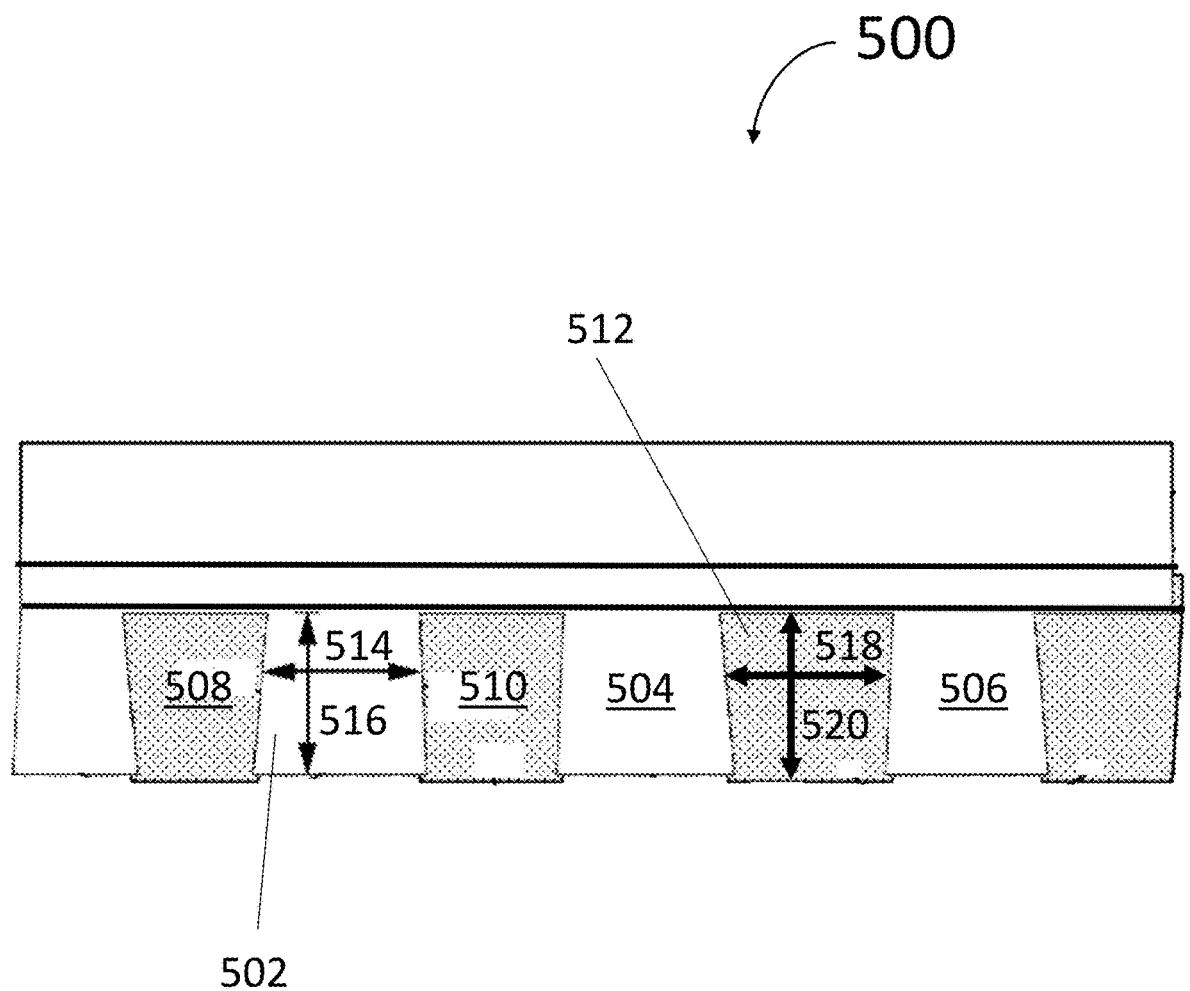
FIG. 5 is a schematic diagram of a roofing shingle, according to some embodiments.

FIG. 5 is a schematic diagram of a roofing shingle 500, according to some embodiments. In some embodiments, the roofing shingle 500 is illustrative of the various dimensions of the tab portion and exposed portion of a roofing shingle. For example, in some embodiments, the roofing shingle 500 comprises a plurality of tab portions 502, 504, 506 and a plurality of exposed portions 508, 510, 512. In some embodiments, the tab portion 502 comprises a width 514 and a height 516. In some embodiments, the exposed portion 512 comprises a width 518 and a height 520. In some embodiments, the surface area of the tab portion 502 is related to the mathematical product of the width 514 multiplied times the height 516. In some embodiments, the surface area of the exposed portion 512 is related to the mathematical product of the width 518 multiplied times the height 520. Although only the dimensions for the tab portion 502 and the exposed portion 512 are discussed, tab portions 504, 506 and exposed portions 508, 510 can have same or similar dimensions, respectively. As used herein, dimensions within 1% of each other are understood to be the same; and dimensions within 5% of each other are understood to be similar.

What is claimed is:

1. A method of manufacturing, comprising:
   obtaining a first colored roofing granule,
      wherein the first colored roofing granule is a first roofing granule coated with a first coating,
         wherein the first coating has a first color,
            wherein the first color has a first wavelength,
               wherein the first wavelength is 400 nm to 800 nm;
   measuring the first wavelength of the first color;
   determining a second wavelength of a second color,
      wherein the determining comprises:
         calculating the second wavelength by multiplying the first wavelength by a first phi factor, wherein the first phi factor is a product of n times φ,
wherein φ is 1.618±ε,
wherein ε is 0 to 1,
wherein n is 0.2 to 3.2,
wherein n is selected such that the second wavelength is within a range of 400 nm to 800 nm;
obtaining a second roofing granule, and a second coating having the second color;
coating the second roofing granule with the second coating, thereby to form a second colored roofing granule;
blending the first colored roofing granule and the second colored roofing granule to form color blended roofing granules; and
applying the color blended roofing granules to a roofing substrate, so as to form a roofing shingle.

2. The method of claim 1, wherein n is 0.3 to 1.2.
3. The method of claim 1, wherein ε is 0.
4. The method of claim 3, wherein n is 0.3 to 1.2.
5. The method of claim 1, wherein the measuring the first wavelength of the first color comprises using at least one of a colorimeter or a spectrophotometer.
6. The method of claim 1, wherein the first wavelength is 400 nm to 585 nm.
7. The method of claim 6, wherein the second wavelength is 620 nm to 800 nm.
8. A method of manufacturing, comprising:
obtaining a first colored roofing granule,
wherein the first colored roofing granule is a first roofing granule coated with a first coating,
wherein the first coating has a first color,
wherein the first color has a first wavelength,
wherein the first wavelength is 400 nm to 800 nm;
measuring the first wavelength of the first color;
determining a second wavelength of a second color,
wherein the determining the second wavelength of the second color comprises:
calculating the second wavelength by multiplying the first wavelength by a first phi factor,
wherein the first phi factor is a product of n times φ,
wherein φ is 1.618±ε,
wherein ε is 0 to 1,
wherein n is 0.2 to 3.2,
wherein n is selected such that the second wavelength is within a range of 400 nm to 800 nm;
determining a third wavelength of a third color,
wherein the determining the third wavelength of the third color comprises:
calculating the third wavelength by multiplying the first wavelength by a second phi factor,
wherein the second phi factor is a product of n times φ,
wherein φ is 1.618±ε,
wherein ε is 0 to 1;
wherein n is 0.2 to 3.2,
wherein n is selected such that the third wavelength is within a range of 400 nm to 800 nm;
obtaining a second roofing granule, a third roofing granule, a second coating having the second color, and a third coating having the third color;
coating each of:
the second roofing granule with the second coating, thereby to form a second colored roofing granule, and
the third roofing granule with the third coating, thereby to form a third colored roofing granule;
blending the first colored roofing granule, the second colored roofing granule, and the third colored roofing granule to form color blended roofing granules; and
applying the color blended roofing granules to a roofing substrate, so as to form a roofing shingle.

9. The method of claim 8, wherein n is 0.3 to 1.2.
10. The method of claim 8, wherein ε is 0.
11. The method of claim 10, wherein n is 0.3 to 1.2.
12. The method of claim 8, wherein the measuring the first wavelength of the first color comprises using at least one of a colorimeter or a spectrophotometer.
13. The method of claim 8, wherein the first wavelength is 400 nm to 585 nm.
14. The method of claim 13, wherein the second wavelength is 620 nm to 800 nm.
15. A method of manufacturing at least two colored products, comprising:
obtaining a first colored roofing granule,
wherein the first colored roofing granule is a first roofing granule coated with a first coating,
wherein the first coating has a first color,
wherein the first color has a first wavelength,
wherein the first wavelength is 400 nm to 800 nm;
measuring the first wavelength of the first color;
determining a second wavelength of a second color,
wherein the determining the second wavelength of the second color comprises:
calculating the second wavelength by multiplying the first wavelength by a first phi factor,
wherein the first phi factor is a product of n times φ,
wherein φ is 1.618±ε,
wherein ε is 0 to 1,
wherein n is 0.2 to 3.2,
wherein n is selected such that the second wavelength is within a range of 400 nm to 800 nm;
determining a third wavelength of a third color,
wherein the determining the third wavelength of the third color comprises:
calculating the third wavelength by multiplying the first wavelength by a second phi factor,
wherein the second phi factor is a product of n times φ,
wherein φ is 1.618±ε,
wherein ε is 0 to 1;
wherein n is 0.2 to 3.2,
wherein n is selected such that the third wavelength is within a range of 400 nm to 800 nm;
obtaining a second roofing granule, a third roofing granule, a second coating having the second color, and a third coating having the third color;
coating each of
the second roofing granule with the second coating, thereby to form a second colored roofing granule, and
the third roofing granule with the third coating, thereby to form a third colored roofing granule;
blending the first colored roofing granule and the second colored roofing granule to form color blended roofing granules;

applying each of
- the colored blended roofing granules to a first roofing substrate, so as to form a first roofing shingle, and
- the third roofing granule to a second roofing substrate, so as to form a second roofing shingle; and installing the first roofing product and the second roofing shingle adjacent one another.

16. The method of claim 15, wherein n is 0.3 to 1.2.
17. The method of claim 15, wherein ε is 0.
18. The method of claim 17, wherein n is 0.3 to 1.2.
19. The method of claim 15, wherein the first wavelength is 400 nm to 585 nm.
20. The method of claim 19, wherein the second wavelength is 620 nm to 800 nm.

* * * * *